United States Patent
Guo et al.

(10) Patent No.: US 10,754,686 B2
(45) Date of Patent: Aug. 25, 2020

(54) METHOD AND ELECTRONIC DEVICE FOR APPLICATION MIGRATION

(71) Applicant: EMC IP Holding Company LLC, Hopkinton, MA (US)

(72) Inventors: Fan Guo, Shanghai (CN); Junping Zhao, Beijing (CN); Kun Wang, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 86 days.

(21) Appl. No.: 16/162,487

(22) Filed: Oct. 17, 2018

(65) Prior Publication Data
US 2019/0121663 A1    Apr. 25, 2019

(30) Foreign Application Priority Data

Oct. 20, 2017  (CN) .......................... 2017 1 0986500

(51) Int. Cl.
*G06F 9/46* (2006.01)
*G06F 9/48* (2006.01)
(Continued)

(52) U.S. Cl.
CPC ........ *G06F 9/4856* (2013.01); *G06F 9/45558* (2013.01); *G06F 9/5027* (2013.01);
(Continued)

(58) Field of Classification Search
CPC .................................................. G06F 9/4856
(Continued)

(56) References Cited

U.S. PATENT DOCUMENTS 7,313,560 B2 * 12/2007 Dilley, Jr. ............. G06F 16/214
7,996,484 B2 *  8/2011 Mundkur ............ G06F 13/4022
                                                          709/213
(Continued)

OTHER PUBLICATIONS

Timothy Dysart et al.; "Highly Scalable Near Memory Processing with Migrating Threads on the Emu System Architecture"; IA and libraries for Mar. 2016; Salt Lake City, Utah, USA; Nov. 2016—IEEE.*

(Continued)

*Primary Examiner* — Francisco J Aponte
(74) *Attorney, Agent, or Firm* — Ryan, Mason & Lewis, LLP (57) ABSTRACT

The present disclosure relate to a method and an electronic device for application migration. The method includes: in response to a migration request for migrating, from a source machine to a target machine, an application executed at a source processing unit on the source machine, establishing a connection between the source machine and the target machine, the request indicating the application to be migrated, the target machine and a target processing unit to operate the application on the target machine; synchronizing a plurality of threads related to the application executed on the source processing unit; determining a resource descriptor and allocation and use conditions of a memory related to the application at the source processing unit; transmitting, via the connection, the determined resource descriptor and the allocation and use conditions of the memory to the target memory, for migration preparation performed by the target machine; and determining, based on the allocation and use conditions of the memory, the data to be migrated, for migration via the connection to the target machine.

20 Claims, 6 Drawing Sheets

(51) Int. Cl.
*G06F 9/455* (2018.01)
*G06F 9/50* (2006.01)

(52) U.S. Cl.
CPC .............. *G06F 2009/4557* (2013.01); *G06F 2009/45583* (2013.01)

(58) Field of Classification Search
USPC ........................................................ 718/104
See application file for complete search history.

(56) References Cited

U.S. PATENT DOCUMENTS

| | | | | |
|---|---|---|---|---|
| 8,200,771 | B2* | 6/2012 | Ganesh | G06F 9/4856 709/212 |
| 8,429,645 | B2* | 4/2013 | Draper | G06F 8/34 717/177 |
| 8,671,256 | B2* | 3/2014 | Dow | G06F 12/08 711/162 |
| 8,688,628 | B2* | 4/2014 | Riemers | G06F 9/466 707/609 |
| 8,869,136 | B2* | 10/2014 | Chapman | G06F 8/77 717/174 |
| 8,924,564 | B2* | 12/2014 | Lublin | G06F 15/16 709/226 |
| 8,990,527 | B1* | 3/2015 | Linstead | G06F 3/0617 711/161 |
| 9,141,625 | B1* | 9/2015 | Thornewell | G06F 16/119 |
| 9,176,773 | B2* | 11/2015 | Fries | G06F 8/76 |
| 9,531,805 | B1* | 12/2016 | Brown | H04L 67/1091 |
| 9,654,415 | B2* | 5/2017 | Kato | H04L 47/76 |
| 9,703,585 | B2* | 7/2017 | Bercovici | G06F 9/4856 |
| 9,910,618 | B1* | 3/2018 | Curley | G06F 3/0647 |
| 10,055,133 | B2* | 8/2018 | Arakawa | G06F 3/0683 |
| 10,061,534 | B2* | 8/2018 | Gupta | G06F 11/2017 |
| 10,169,065 | B1* | 1/2019 | Nye | G06F 11/2025 |
| 10,462,012 | B1* | 10/2019 | Rao | G06F 16/214 |
| 10,503,612 | B1* | 12/2019 | Wang | G06F 9/45558 |
| 10,616,127 | B1* | 4/2020 | Suit | G06F 9/5077 |
| 2007/0294578 | A1* | 12/2007 | Qiao | G06F 11/2046 714/17 |
| 2009/0070771 | A1* | 3/2009 | Yuyitung | G06Q 10/06 718/105 |
| 2009/0327807 | A1* | 12/2009 | Varadarajan | G06F 11/1438 714/15 |
| 2010/0287560 | A1* | 11/2010 | Neft | G06F 9/4856 718/104 |
| 2010/0325288 | A1* | 12/2010 | Jagadish | G06F 9/54 709/227 |
| 2012/0066541 | A1* | 3/2012 | Dournov | G06F 11/0709 714/3 |
| 2012/0303799 | A1* | 11/2012 | Hadas | G06F 9/4856 709/224 |
| 2013/0054734 | A1* | 2/2013 | Bond | G06F 9/4856 709/217 |
| 2013/0166504 | A1* | 6/2013 | Varkhedi | G06F 9/4856 707/610 |
| 2013/0326546 | A1* | 12/2013 | Bavishi | G06F 16/214 719/328 |
| 2014/0082479 | A1* | 3/2014 | Guinane | G06F 40/14 715/234 |
| 2014/0082616 | A1* | 3/2014 | Kurita | G06F 9/455 718/1 |
| 2014/0325503 | A1* | 10/2014 | Li | G06F 11/34 717/177 |
| 2015/0032986 | A1* | 1/2015 | Moore | G06F 9/00 711/171 |
| 2015/0150019 | A1* | 5/2015 | Sheaffer | G06F 9/5044 718/104 |
| 2015/0304243 | A1* | 10/2015 | Jasperson, Jr. | H04L 47/808 709/225 |
| 2016/0004553 | A1* | 1/2016 | Torii | G06F 9/4856 718/1 |
| 2016/0011913 | A1* | 1/2016 | Novikov | G06F 9/5077 718/1 |
| 2016/0036923 | A1* | 2/2016 | Phanishayee | G06F 9/4856 709/217 |
| 2016/0092266 | A1* | 3/2016 | Bavishi | G06F 9/4856 718/1 |
| 2016/0110210 | A1* | 4/2016 | Vecera | G06F 9/45558 718/1 |
| 2016/0112510 | A1* | 4/2016 | Bai | H04L 67/1095 709/217 |
| 2016/0357473 | A1* | 12/2016 | Kim | G06F 12/0223 |
| 2017/0005990 | A1* | 1/2017 | Birger | H04L 63/045 |
| 2017/0012854 | A1* | 1/2017 | Balasubramanian | G06F 9/5072 |
| 2017/0139729 | A1* | 5/2017 | Cropper | G06F 9/4881 |
| 2017/0242779 | A1* | 8/2017 | Alger | G06F 9/44505 |
| 2017/0244788 | A1* | 8/2017 | Bai | H04L 67/1095 |
| 2017/0364387 | A1* | 12/2017 | Ahmed | G06F 9/4856 |
| 2018/0060120 | A1* | 3/2018 | Nassi | G06F 9/30123 |
| 2018/0113797 | A1* | 4/2018 | Breslow | G06F 8/71 |
| 2018/0239555 | A1* | 8/2018 | Cao | G06F 3/0647 |
| 2018/0284999 | A1* | 10/2018 | Aslam | G06F 3/0604 |
| 2018/0349199 | A1* | 12/2018 | Vyas | G06F 11/3003 |
| 2019/0034226 | A1* | 1/2019 | Gao | H04L 61/6009 |
| 2019/0235895 | A1* | 8/2019 | Ovesea | G06F 9/45558 |
| 2019/0235918 | A1* | 8/2019 | Liu | G06F 3/0647 |
| 2020/0034167 | A1* | 1/2020 | Parthasarathy | G06F 9/45558 |
| 2020/0089515 | A1* | 3/2020 | Hari | G06F 9/4856 |

OTHER PUBLICATIONS

Rachata Ausavarungnirun et al.; "Mosaic: A GPU Memory Manager with Application-Transparent Support for Multiple Page Sizes"; MICRO-50, Oct. 14-18, 2017, Cambridge, MA, USA—2017 Association for Computing Machinery, ACM ISBN 978-1-4503-4952-9.*

* cited by examiner

METHOD AND ELECTRONIC DEVICE FOR APPLICATION MIGRATION

RELATED APPLICATIONS

This application claims priority from Chinese Patent Application Number CN 201710986500.0, filed on Oct. 20, 2017 at the State Intellectual Property Office, China, titled "METHOD AND ELECTRONIC EQUIPMENT FOR APPLICATION MIGRATION" the content of which is incorporated by reference herein in its entirety.

FIELD

The present disclosure generally relates to application migration. More specifically, the present disclosure relates to a method, an electronic device and a computer program product for inter-machine application migration.

BACKGROUND

Emerging technologies, such as machine learning, cloud computing, and the like, require a Graphic Processing Unit (GPU) cluster system as a basic structure. The GPU cluster system typically includes a plurality of server nodes, each of which includes one or more GPUs. In some circumstances, the GPU cluster system needs to migrate an application executed on a certain server to another server. These circumstances for example include a situation in which failure occurs to the server operating the application, and the like. The traditional migration process has a negative impact on normal operation of the migrated application, or even renders the application unable to be executed correctly on the target machine.

SUMMARY

The present disclosure provides a method and a system for application migration, and is capable of implementing migration of the application executed from one machine to a further machine.

According to a first aspect of the present disclosure, there is provided a method of application migration. The method comprises: in response to a migration request for migrating, from a source machine to a target machine, an application executed at a source processing unit on the source machine, establishing a connection between the source machine and the target machine, the request indicating the application to be migrated, the target machine and a target processing unit to operate the application on the target machine; synchronizing a plurality of threads related to the application operated on the source processing unit; determining a resource descriptor and allocation and use conditions of a memory related to the application at the source processing unit; transmitting, via the connection to the target memory, the determined resource descriptor and the allocation and use conditions of the memory, for migration preparation performed by the target machine; and determining, based on the allocation and use conditions of the memory, data to be migrated, for migration via the connection to the target machine.

According to a second aspect of the present invention, there is provided an electronic device. The system comprises: a memory configured to store one or more programs; and a processing unit coupled to the memory and configured to execute the one or more programs to cause the electronic device to perform the method according to the first aspect of the present disclosure.

According to a third aspect of the present disclosure, there is provided a method for a target machine of application migration. The method comprises: in response to receiving a connection request from a source machine, establishing a connection between the target machine and the source machine; receiving, via the connection, a resource descriptor and allocation and use conditions of a memory related to an application to be migrated on the source machine; performing, based on the received resource descriptor and allocation and use conditions of the memory, migration preparation including creating a resource descriptor demanded for operating the application at a processing unit of the target machine; receiving migration data of the application via the connection from the source machine; and configuring, based on the created resource descriptor, the processing unit to at least one of: store the migration data, and process the migration data.

According to a fourth aspect of the present invention, there is provided a target machine. The target machine comprises: a memory configured to store one or more programs; and a processing unit coupled to the memory and configured to execute one or more programs to cause the target machine to perform the method according to the third aspect of the present disclosure.

According to a fifth aspect of the present disclosure, there is provided a method for a client of application migration. The method comprises: transmitting a request for the application generated at the client to a source machine for operating the application; and in response to addressing information of the target machine to which an application from the source machine has been migrated, redirecting a request for the application to the target machine, such that the request can be processed on the target machine.

According to a sixth aspect of the present invention, there is provided an electronic device. The electronic device comprises: a memory configured to store more one or more programs; and a processing unit coupled to the memory and configured to execute the one or more programs to cause the electronic device to perform the method according to the fifth aspect of the present disclosure.

According to a seventh aspect of the present disclosure, there is provided a computer program product. The computer program product is tangibly stored on a non-transient computer readable medium and includes machine executable instructions, and the machine executable instructions when executed cause the machine to perform steps of the method according to the first aspect, the third aspect or the fifth aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description of example embodiments of the present disclosure with reference to the accompanying drawings, the above and other objectives, features, and advantages of the present disclosure will become more apparent, and wherein, the same reference symbols generally represent the same components in the example embodiments of the present disclosure.

Throughout the drawings, the same or similar reference symbols refer to the same or similar elements.

DETAILED DESCRIPTION OF EMBODIMENTS

In order to lower risks during a migration course, the traditional method of application migration typically chooses to stop an operating application, and obviously interrupts requests for the application from a client, or even closes down the system for a time period, so as to perform the application migration. This brings about remarkable influences on the operating application. As a result, the traditional method of application migration is unable to solve the technical problem of migrating the operating application from a source machine to a further machine for continuing to operate the application. The major technical difficulties lie in: 1) how to ensure correctness and integrity of data before and after the application migration; and 2) how to avoid the system performance from being affected by the application migration. Research has found that the foregoing technical difficulties can be overcome through the main means as below: regarding correctness and integrity of data, there are generally a great number of threads, a typical GPU has more than 5,000 kernels each of which is operating concurrently, therefore, it is of necessary to synchronize, through a migration request, a plurality of threads related to the application executed on the source processing unit, to avoid dependency and modification between data before and after the migration, and to further ensure safe migration of the status and data related to the application. In addition, a resource descriptor related to the application at the source processing unit is determined and transmitted to the target machine for migration preparation, to configure the target machine with a processing unit to operate the application and allocate the memory. Furthermore, data to be migrated are determined based on allocation and use conditions of the memory related to the application executed on the source processing unit, so as to avoid transmission of unrelated data to the target machine, accelerate the data migration, and reduce the influences on the system performance.

Moreover, in order to accelerate data migration and optimize the system performance, the present application employs, based on a size of the data to be migrated, asynchronous batch transmission and asynchronous on-demand transmission, respectively, i.e., the target machine restores operation of the application upon receiving data sent preferentially by the source machine, and then receives the remaining data to be migrated or demanded data in the data to be migrated. As such, the application can be quickly executed on the target machine, thereby improving the system performance. In addition, through a coordinated cooperation among the client, the source machine and the target machine, the present disclosure also causes the application requests generated before and after the migration to be sent continuously to a respective machine for processing. This further ensures that the requests are executed completely and in succession, and the application is migrated smoothly.

The embodiments of the present disclosure will be described below in detail with reference to the accompanying drawings. Although some embodiments of the present disclosure are illustrated in the drawings, it would be appreciated that the present disclosure could be implemented in various forms but should not be construed as being limited to the embodiments described herein, which are instead provided to enable the present disclosure to be understood thoroughly and completely. It would be appreciated that the drawings and embodiments of the present disclosure are provided only as examples, without any intention to limit the protection scope of the present disclosure. The term "processing unit" used herein can be any appropriate physical or virtual processor capable of executing various processing based on program code instructions. The processing unit can include one or more kernels. In a circumstance of including more kernels, the more kernels can operate concurrently, thereby improving the processing efficiency of the processing unit. A dedicated processing unit for example includes a Graphic Processing Unit (GPU), a Field-Programmable Gate Array (FPGA), an Application-specific Integrated Circuit (ASIC), and the like. A general processing unit for example includes a Central Processing Unit (CPU). For convenience of discussion, GPU is described as an example of the dedicated processing unit in some embodiments.

As used herein, the term "includes" and its variants are to be read as open-ended terms that mean "includes, but is not limited to." The term "based on" is to be read as "based at least in part on." The term "one example embodiment" is to be read as "at least one example embodiment;" and the term "another example" is to be read as "at least another example." Relevant definitions of other terms will be given in the following description.

Figure 1:
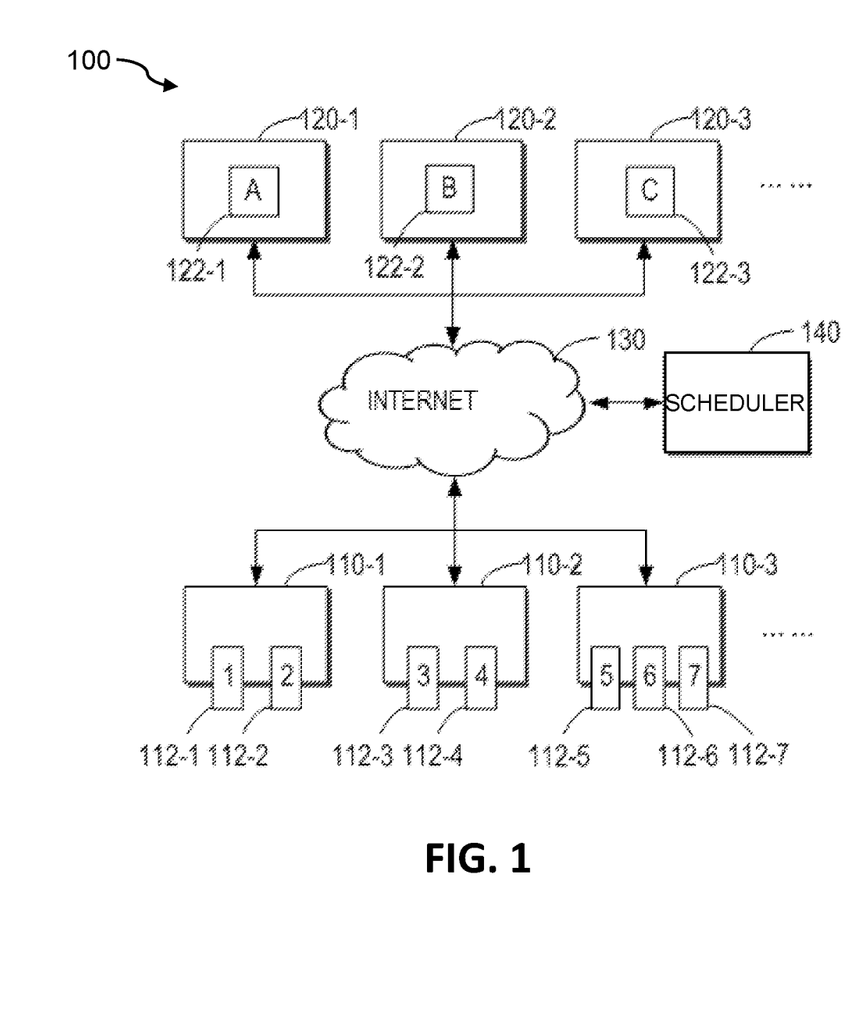
FIG. 1 illustrates a diagram of a cloud-based system 100.

FIG. 1 illustrates a diagram of an example system 100 using the solution as described above, in which the embodiments of the present disclosure can be implemented. In the system 100 are deployed a plurality of machines 110-1, 110-2, 110-3, and the like (hereinafter referred to as a machine 110 collectively or individually) for application operation. The machine 110 can be a physical or virtual machine. For example, the machine can be logic, or a virtual machine deployed at a datacenter or in a private or public cloud, or a physical server or computing device, or the like. Each machine 110 can be provided with one or more processing units thereon, including dedicated processing units, such as GPUs, FPGAs, ASICs, and the like, and general processing units, such as CPUs.

In the example of FIG. 1, the machine 110-1 includes two dedicated processing units 112-1 and 112-2, the machine 110-2 includes two dedicated processing units 112-3 and 112-4, and the machine 110-3 includes three dedicated processing units 112-5, 112-6 and 112-7. These dedicated processing units will be collectively or individually referred to as a dedicated processing unit 112 hereinafter. Besides the dedicated processing unit 112, the machine 110 further includes one or more general processing units (not shown).

FIG. 1 shows three clients 120-1, 120-2 and 120-3 (hereinafter referred to as a client 120 collectively or individually) having applications 122-1, 122-2 and 122-3 (hereinafter referred to as an application 122 collectively or individually) to be executed, respectively. The client 120 can be any terminal device, computer or server. The application 122 can be any application operable on the processing unit, which can be designed as executing a respective task, such as data processing or analysis, or the like. As an example, the application can execute a data processing or analysis task related to a High Performance Computing (HPC), Machine Learning (ML) or Deep Learning (DL), Artificial Intelligence (AI), and the like.

In order to operate these applications quickly and efficiently and/or to reserve local processing resources, the client 120 can request the dedicated processing unit 112 of the machine 110 to operate these applications 122. In the implementation, the client 120 can be connected to one or more machines 110 via an interconnected network 130, and the applications 122 are executed by one or more dedicated processing units 112 of the machine 110. Depending on interfaces supported by the client 120, the machine 110 and/or the dedicated processing unit 112, the interconnected network 130 can support different types of wired or wireless connections of various network transmission technologies based on, for example, Remote Direct Memory Access (RDMA), Transmission Control Protocol (TCP), and the like.

In the system 100, a plurality of dedicated processing units 112 can be pooled or virtualized, for use by a plurality of clients 120 or a plurality of applications 122 therein. In the client 120, a virtual processing unit can be presented for operating the application 122 of the client 120, but the application 122 is executed by one or more dedicated processing units at the machine 110 side, in fact. The client 120 can request use of the dedicated processing units according to needs. The system 100 also includes a scheduler 140 for scheduling the plurality of applications 122 of the client 120 to one or more dedicated processing units 112 of the one or more machines 110 for operation. Moreover, the scheduler 140 can schedule a plurality of applications 122 from the same or different clients 120 to the same dedicated processing unit 112 for operation.

It would be appreciated that the device and/or arrangement as shown in FIG. 1 are/is provided only as an example. In other examples, the system 100 can include any appropriate number of machines 110 and clients 120. Each machine 110 can be provided with any appropriate number of dedicated processing units 112, and each client 120 can have a plurality of applications 122 to be executed. In addition, although shown separately, the scheduler 140 can be implemented by another device independent of the machine 110, or can be implemented partly or completely on one or more machines 110 in practice.

In the system 100, the scheduler 140 can schedule the application 122 across a plurality of dedicated processing units 112, so as to achieve a dynamic load balance of the dedicated processing units 112 and thus improve the overall performance of the system. The scheduler 140 can dynamically integrate a plurality of applications 122 into a single dedicated processing unit 112, so as to improve utilization of the dedicated processing units 112 and reduce the cost of the system accordingly. Moreover, the scheduler 140 can provide QoS demand-based scheduling for the application 122, to lower the influences of the application with a low level on other applications with high levels according to the Service Level Agreement (SLA).

Figure 2:
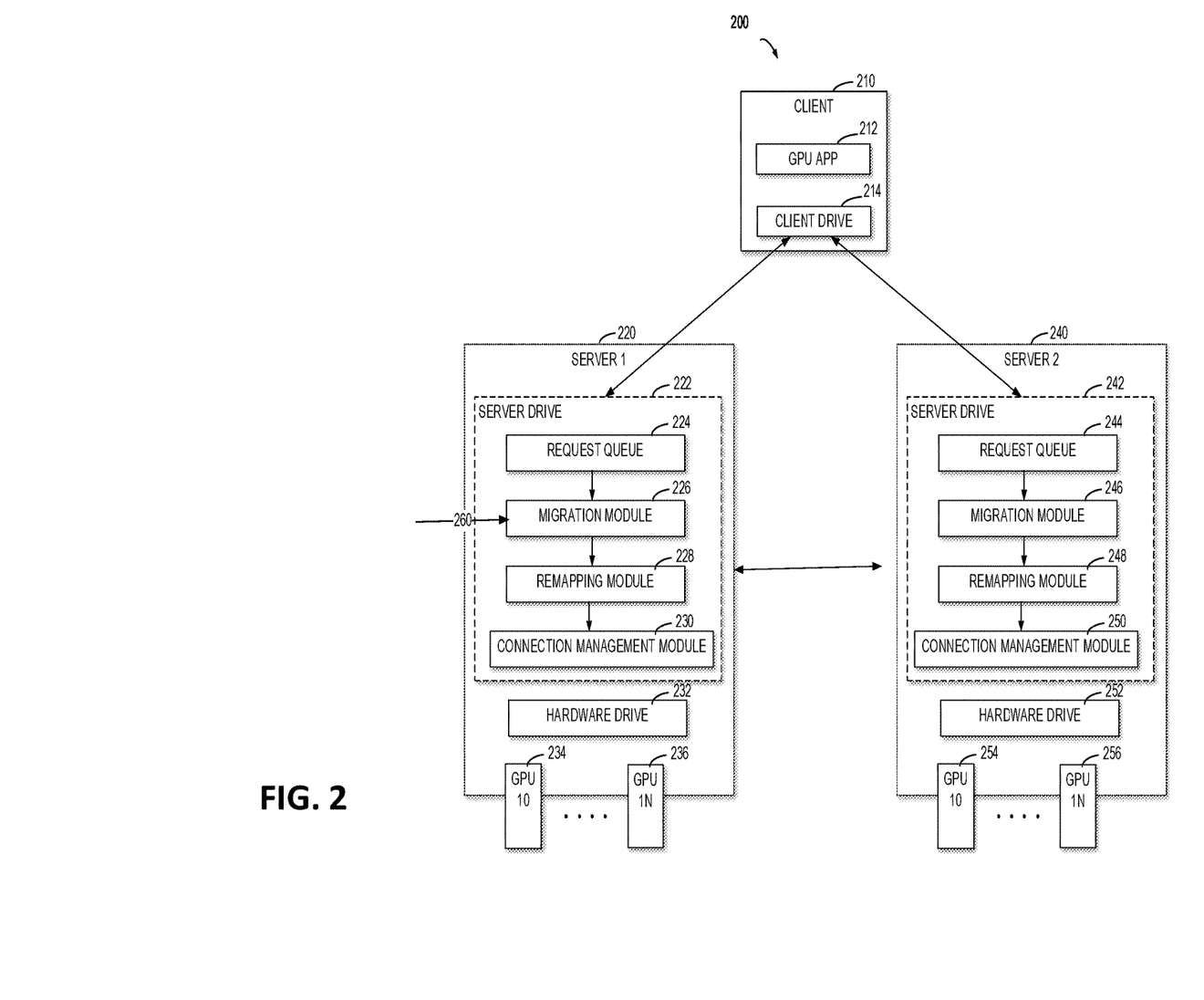
FIG. 2 illustrates a structure diagram of a system 200 for application migration according to embodiments of the present disclosure.

FIG. 2 illustrates a structure diagram of a migration system 200 applicable to applications according to embodiments of the present disclosure. It would be appreciated that the structure and functions of the system 200 as shown in FIG. 2 are only provided as an example, without implying any limitation to the scope of the present disclosure. The embodiments of the present disclosure can be embodied in different structures and/or functions.

As shown in FIG. 2, the system 200 includes a client 210 and a plurality of machines 220 and 240. Wherein, the machine 220 receives a migration request 260 from a scheduler (not shown in FIG. 2), to implement migration of the application executed on the machine 220 to the machine 240.

The migration request 260 is generated, based on a predetermined migrate policy, by the scheduler (not shown) of the system 200, for example, the one that the system can automatically trigger migration to cause the migration request 260 transmitted to the source machine 220 for triggering application migration, if the processing unit of the source machine has exceedingly high utilization, or the application cannot be satisfied. The migration request 260 typically indicates the application to be migrated, the target machine and the target processing unit to operate the application.

The client 210 includes an application 212 and a client drive 214, and as described above, the application 212 is actually executed by a physical processing unit at the machine side, for example the processing unit 234 of the machine 220. The client drive 214 is provided for intercepting requests for the application 212 at the client, and sending the intercepted requests to the machine 220 operating the application in fact. Besides, upon receiving addressing information of a new machine (for example, a machine 240) to which the application 212 has been migrated, the client drive 214 can redirect them to a new machine, i.e., the target machine 240, so as to transmit the requests for the application 212 to the target machine 240 for further operation.

The machine 220 is for example the source machine 220 operating the application to be migrated. The source machine 220 for example includes a server drive 222, a hardware drive 232 and a plurality of processing units 234, 236. Wherein, the processing unit 234 is for example the source processing unit in the source machine 220 operating the application to be migrated. The server drive 222 is responsible for request processing, device management and data management of all processing units (for example, GPU) on the machine 220. It is disposed on each node of the system 200, i.e., each machine, and in some embodiments, the server drive 222 is disposed for example on each processing unit 234, 236, for example on each GPU. The server drive 222 further includes a request queue 224, a migration module 226, a remapping module 228 and a connection management module 230. Wherein, the request queue 224 is provided for receiving, storing and managing requests for the application from a client in the manner of First-in First-out. The migration module 226 is provided for supporting a configurable migration policy, and determining data to be migrated related to the application to be migrated from the source processing unit to the target unit. The remapping module 228 is provided for tracking continuously at the source processing unit a resource descriptor and allocation and use conditions of the memory related to the application to be migrated, for use in remapping after data migration to the target machine, so as to ensure that a pointer is valid on the target processing unit. The connection management module 230 is provided for establishing a network connection between the source machine and the target machine, so as to transmit and receive data via the connection. The hardware drive 232 contains drive programs related to the hardware device included in the source machine 200, such as NVIDIA CUDA drive programs, and the like, and these drive programs for example are provided by an operating system or a hardware supplier.

The machine 240 for example is a target machine 240 to operate the application to be migrated. The target machine 240 for example includes a server drive 242, a hardware drive 252 and a plurality of processing units 254, 256. For example, the processing unit 254 is the target processing unit to operate the application to be migrated. The server drive 242 is responsible for request processing, device management and data management of all GPUs on the machine 240. The target machine 240 is required to process requests after completing the application migration and operating the application, and probably to transfer the application executed on the machine 240 to a further machine, in response to a new migration request from the scheduler. Therefore, having a similar structure as the machine 220 does, the machine 240 likewise includes a similar request queue 244, migration module 246, remapping module 248, and connection management module 250.

Figure 3:
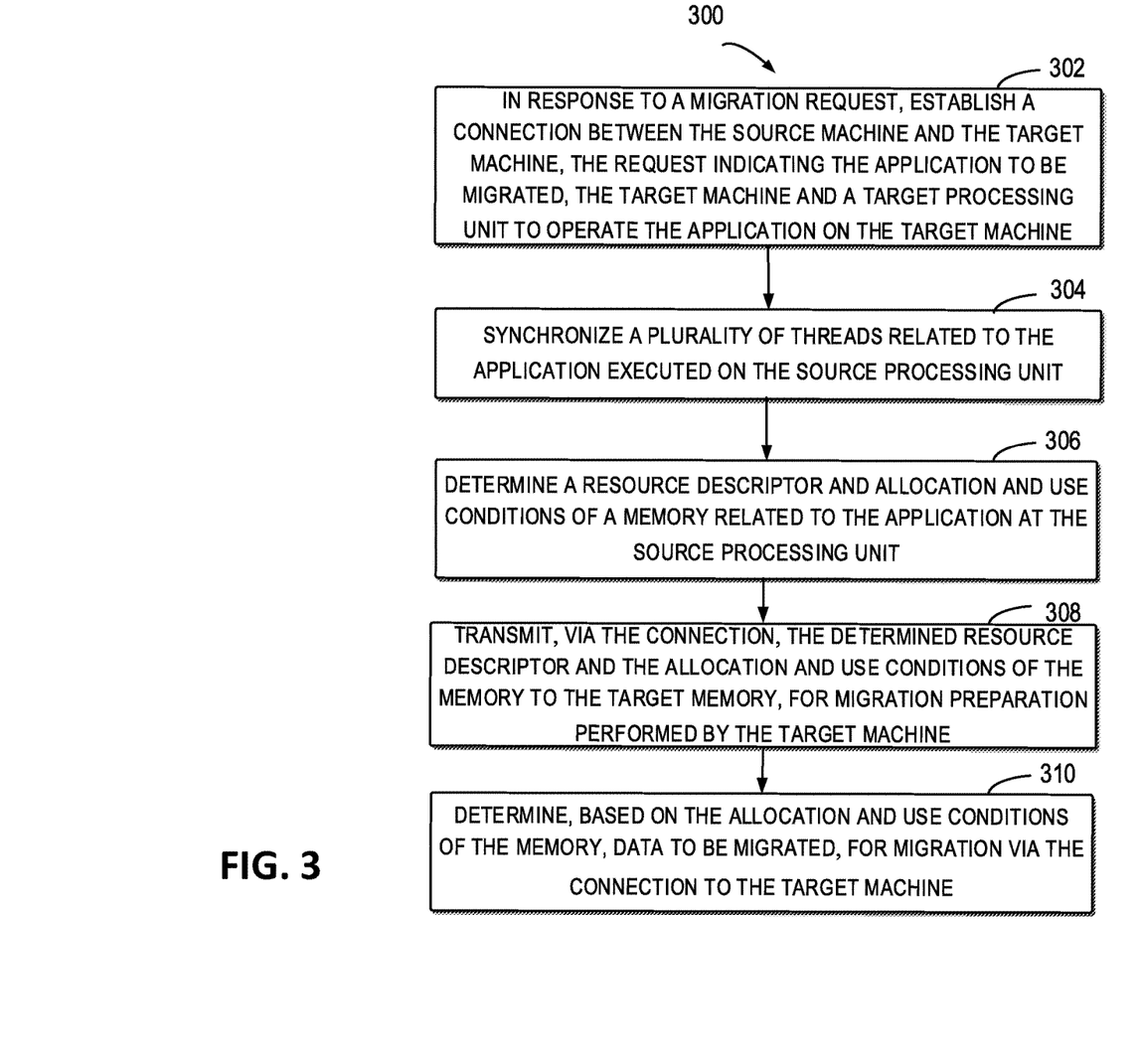
FIG. 3 illustrates a flowchart of a method 300 of application migration according to embodiments of the present disclosure.

FIG. 3 illustrates a flowchart of a method 300 of application migration according to embodiments of the present disclosure. The method 300 of migration in FIG. 3 will be described below in details with reference to the system 200 in FIG. 2. For the sake of discussion, without sacrificing generality, the method 300 will be described with the client 210, the source machine 220 and the target machine 240 shown in FIG. 2 as an example. In FIG. 3, various acts for example are executed by the source machine 220. The method 300 can further include additional acts not shown and/or can skip over the acts as shown therein, and the scope of the present disclosure is not limited in this aspect.

At block 302, in response to a migration request for migrating an application executed at a source processing unit on the source machine to a target machine, a connection between the source machine and the target machine is established, and the request indicates the application to be migrated, the target machine and the target processing unit to operate the application on the target machine. In some embodiments, a network connection between the source machine 220 and the target machine 240 is established for example based on TCP/IP or Remote Direct Memory Access (RDMA), or the like. In some embodiments, the migration request 260 is triggered based on a configurable migration policy. The configurable migration policy therein for example includes, but not limited to, a dynamic load balance, application operation quality, resource compression, and the like. In some embodiments, the source processing unit 234 and the target processing unit 254 for example are GPU or FPGA.

At block 304, a plurality of threads related to the application operating on the source processing unit are synchronized. The application programs operating as an entirety can act as a single portion, and the application programs are forced to be synchronized. For example, a clear "synchronization point" is created to cause the application involving a plurality of threads to be executed to the "synchronization point," such that all statuses and data of the application can be synchronized to the memory of the processing unit. In some embodiments, the synchronization needs to call the video card, and the API provided by the drive of the GPU, such as cuSyncThread ( ), cuSyncCtx ( ), or the like, such that the requests that have been provided to the source processing unit but not completed yet are executed to an end state or a unified state. Through synchronization, it is avoided that, when a portion of data is being migrated, the subsequent data are dependent on the portion of data having been migrated or there is a need for modifying the data having been migrated. In some embodiments, it generally takes some time for synchronization, and the magnitude of time is generally lower than a second.

At block 306, a resource descriptor and allocation and use conditions of the memory related to the application at the source processing unit are determined. Some important resources are required to operate the application programs on the processing unit and the status needs to be processed carefully, so as to perform migration uniformly, and smooth restoring is then performed on the target machine (supposing that there is no structural difference between the original machine and the processing unit of the target machine). These important resources include: operating a context, a related handle and the like, remapping a context of the original machine to create a new context and a handle in the target machine, and the like. It is required to determine the resource descriptor and the allocation and use conditions of the memory related to the application at the source processing unit. In some embodiments, the source machine 220 continuously tracks allocation information and use information of the memory related to the application at the processing unit, and the resource descriptor and the allocation and use conditions of the memory related to the application at the source processing unit are determined based on the data obtained by continuous tracking. Wherein, the allocation and use conditions of the memory include a starting address, a length, a type and a use status of the memory. In some embodiments, based on the allocation and use conditions are generated metadata which indicate a starting address of the allocated memory, an allocated length, the type of the memory (for example, whether the location is on the GPU or the CPU) and a used status (for example, whether it is accessed or used).

At block 308, the determined resource descriptor and the allocation and use conditions of the memory are transmitted via the connection to the target machine, for use by the target machine to make migration preparation. Wherein, the resource descriptor for example is the context and a handle symbol related to the application 212 at the source processing unit 220. Typically, the context indicates a general operating environment, which must initialize the respective processing unit before operating the code of the application. The handle is a reference object of the client visible to the API operation related to the application, such as flow, cuBlas, cusDNN, and the like. The resource descriptor related to the application at the source processing unit is transmitted to the target machine 240, such that the migration preparation for the resource descriptor, the allocated memory and the like, required for operating the application at the processing unit of the target machine can be pre-created before actual transmitting and receiving of the data to be migrated.

At block 310, based on the allocation and use conditions of the memory, the data to be migrated are determined to be migrated via the connection to the target machine. When there is a great amount of data to be migrated, the data migration is slow and affects the system performance seriously. Hence, it is necessary to further accelerate the speed of the data migration between the source machine and the target machine. In some embodiments, the source machine 220 determines the allocated and used memory data as the migration data related to the application, based on the allocation and use conditions of the memory. It does not need to migrate the memory data having been allocated but never been used. As such, the range of data to be migrated can be narrowed, so as to accelerate the data migration. In some circumstances, even though only the allocated and used memory data are determined as the data to be migrated, there are still massive data to be migrated. Therefore, the asynchronous batch transmission is started to further optimize the data migration. In some embodiments, in response to determining that the amount of data to be migrated exceeds a predetermined threshold, a first portion of data which is used most recently in the data to be migrated is transmitted to the target machine; and in response to receiving an indication that the application has been executed on the target machine 240, the source machine 220 will transmit to the target machine a second portion of data, the second portion of data is remaining data in the data to be migrated, other than the first portion of data. In other words, in response to the amount of data to be migrated exceeding for example 1G or 2G, the predetermined threshold can be preset according to needs, and the data accessed most recently in the migration data are preferentially transmitted to the target machine 240, such that the application can be executed quickly on the target machine 240; and subsequently, in response to receiving an indication (from the target machine 240) that the application 212 has been executed on the target machine 240, the remaining data (i.e., the second portion of data) other than the data transmitted preferentially (i.e., the first portion of data) are transmitted in batch. The batch transmission for example is performed via a backstage. In some embodiments, in order to further optimize the data migration, the first portion of data used most recently in the data to be migrated are transmitted to the target machine, in response to determining that the amount of the data to be migrated exceeds the predetermined threshold; and in response to receiving from the target machine a request for a third portion of data, the third portion of data is transmitted to the target machine, wherein the third portion of data is a portion of data in the data to be migrated, other than the first portion of data. In other words, in response to receiving a further data request of the target machine, data related to the data request for other data in the data to be migrated, after transmitting preferentially the most recently accessed data to the target data, which causes the application can be executed on the target machine. For example, during the course that the client accesses the target machine, or when the application is executed at the target machine in response to the request, it is found that some data are missing, a status of "absence of data" is marked in the target machine and "on-demand data transmission" is triggered simultaneously. For example, the respective data request generated by the target machine 240 is transmitted to the source machine directly or via the client 210, and in response to the data request received from the target machine 240, the source machine 220 transmits to the target machine a portion of (i.e., the third portion of data) related to the data request, the portion of data is a portion of data in the data of the data to be migrated, other than the preferentially transmitted data (i.e., the first portion of data). By the asynchronous batch transmission of the data to be migrated or the asynchronous on-demand transmission of the data to be migrated, on one hand, the target machine can quickly restore and operate, based on the data transmitted preferentially, the application thereon, thus causing the client to quickly establish a connection with the target machine; on the other hand, the integrity of the data demanded for continuously operating the application on the target machine is ensured by transmitting subsequently in batch the remaining data to be migrated, or the data to be migrated which are demanded by the on-demand transmission. Therefore, the data moving process of application migration is further optimized.

In some embodiments, the method 300 further includes: in response to the data to be migrated having been migrated, the request for the application received after receiving the migration request is transmitted to the target machine via a First-in First-out (FIFO) queue. The First-in First-out (FIFO) queue for example is implemented by the request queue 224 in the server drive 222 of the source machine 220. Specifically, the request queue 224 stores therein the application requests received from the client after the migration request, which are not transmitted to the processing unit 234 for processing; after receiving, from the target machine, the indication that migration of the data to be migrated has been migrated, the stored requests not being processed are sent to the request queue 244 in the target machine 240 in a manner of First-in First-out (FIFO) queue, such that the target machine 240 can process these requests sequentially. By the above means, after the migration has been completed, the target machine can process sequentially the application requests received but not processed during the migration, so as to ensure that all the requests from the client for the application can be executed completely and continuously, thereby rendering the application switched onto the target machine smoothly.

In some embodiments, the method 300 further includes: in response to receiving from the target machine an indication that the application has been executed on the target machine, transmitting addressing information of the target machine to the client, such that the client can redirect the request for the application to the target machine. For example, after the application 212 has been executed on the processing unit 254 of the target machine 240, the target machine 240 transmits the respective indication to the source machine 220, and upon receiving the indication, the source machine 220 transmits a message to the client 210 to indicate the status that the application 212 has been migrated, and the addressing information of the target machine 240, such that the client 210 can transmit a request for establishing a connection with the target machine 240, and the request for the application is redirected to the target machine 240. The source machine transmits a message to the client in a manner of internal events, to reconnect the client normally to the target machine and reduce the influences on the client application.

In some embodiments, routines of the method 300 are divided into "before migration", "migration" and "after migration." At the phase of "before migration," preparation before migration is mainly performed, for example suspending processing of the application request, synchronizing and determining data to be migrated. At the phase of "migration," transmission of the data to be migrated is mainly performed. At the phase of "after migration," it is mainly performed that the source machine transmits the requests not processed, the second portion of data or the third portion of data in data to be migrated, or the like.

Figure 4:
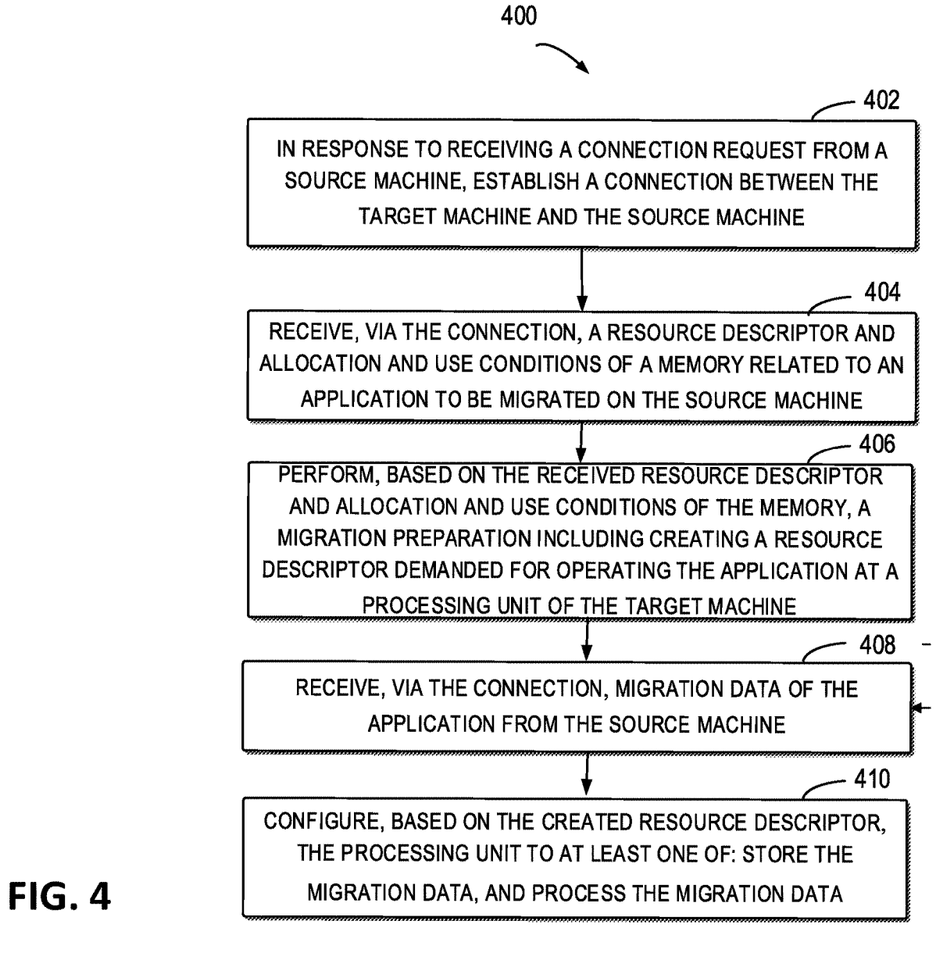
FIG. 4 illustrates a flowchart of a method 400 of a target machine of application migration according to embodiments of the present disclosure.

The flowchart of the method 400 for a target machine of application migration will be described below in detail with reference to FIG. 4. FIG. 4 illustrates a flowchart of a management method 400 for a target machine of application migration according to embodiments of the present disclosure. For the sake of discussion, without sacrificing generality, the method 400 will be described with the client 210, the source machine 220 and the target machine 240 shown in FIG. 2 as an example. In FIG. 4, various acts for example are executed by the target machine 240. The method 400 can further include additional acts not shown and/or can skip over acts shown therein, and the scope of the present disclosure is not limited in this aspect.

At block 402, in response to receiving a connection request from the source machine, a connection between the target machine and the source machine is established. For example, in response to the connection request of the source machine 220 operating the application 212 to be migrated, a connection between the target machine 240 and the source machine 220 is established; the connection request for example includes: a target processing unit on the target machine 240 to operate the application 212, for example the processing unit 254.

At block 404, the resource descriptor, the allocation and use conditions of the memory related to the application to be migrated on the source machine are received via the connection. In some embodiments, the source machine 220 continuously tracks the resource descriptor related to the application, and then transmits the same resource descriptor to the target machine 240, such that the target machine can make preparation before data migration.

At block 406, migration preparation is performed based on the received resource descriptor, the received allocated and use conditions of the memory, including creating a resource descriptor demanded for operating the application at the processing unit on the target machine. In some embodiments, the target machine 240 creates, based on the received resource descriptor at the source machine 220, a respective resource descriptor demanded for operating the application 212 at the target processing unit 240. Further, the migration preparation includes that: based on the received allocation and use conditions of the memory related to the application at the source processing unit, particularly based on the allocation length of the memory therein, the target machine 240 pre-assigns a memory having the same length for storing the received data to be migrated, and then remaps a pointer (an entire storage block and a given offset). The problem of pointer confliction is solved by transparently remapping the existing memory of the target machine based on the related allocation and use conditions of the memory of the processing unit of the source machine.

At block 408, the migration data of the application are received from the source machine via the connection. The received migration data are varied with the different transmission. In the embodiments of synchronous transmission, the received migration data are all data to be migrated related to the application. In the embodiments of asynchronous batch transmission, the target machine 240 first receives the first portion of data transmitted preferentially by the source machine. Upon receiving the first portion of data, the target machine 240 starts to execute acts of configuring the processing unit, operating the application, and the like. After the application has been successfully executed on the target processing unit 254, the target machine 240 can receive in batch, via the backstage, the remaining data (i.e., the second portion of data) in the data to be migrated, other than the data migrated preferentially. In the embodiments of asynchronous on-demand transmission, the target machine 240 first receives the first portion of data transmitted preferentially by the source machine 220. Upon receiving the first portion of data, the target machine 240 configures the processing unit and restores operation of the application. After operation of the application 212 on the processing unit 254 has been completed, when finding some data affecting the continuous operation of the application are missing, the target machine 240 generates a respective data request and transmits the same to the source machine 220 directly or via the client, and then receives the portion of data (i.e., the third portion of data) related to the data request, for continuous operation of the application, wherein the portion of data is a portion of data in the data of the data to be migrated, other than the data to be transmitted preferentially (i.e., the first portion of data).

At block 410, the processing unit is configured based on the created resource descriptor, to at least one of: store the migration data, and process the migration data. The processing unit is configured based on the resource descriptor created previously, and for example, the processing unit 254 is configured, such that the processing unit 254 can perform, based on the stored migration data, respective processing in view of the application request.

Figure 5:
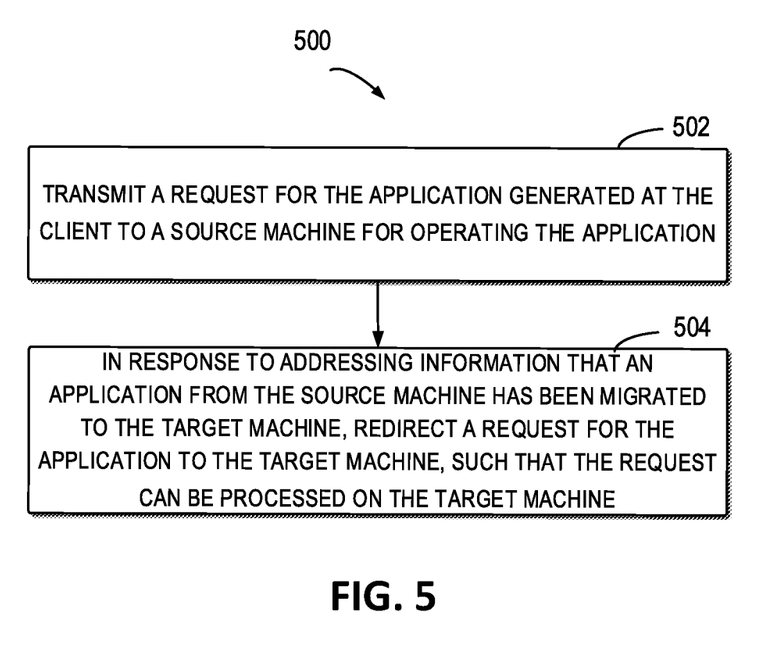
FIG. 5 illustrates a flowchart of a method 500 of a client for application migration according to embodiments of the present disclosure.

The flowchart of the method 500 for a client of application migration will be described below in detail with reference to FIG. 5. FIG. 5 illustrates a flow of the method for a client of application migration according to embodiments of the present disclosure. For the sake of discussion, without sacrificing generality, the method 500 will be described with the client 210, the source machine 220 and the target machine 240 shown in FIG. 2 as an example. The method 500 can further include additional acts not shown and/or can skip over the acts shown therein, and the scope of the present disclosure is not limited in this aspect.

At block 502, a request related to the application generated at the client is transmitted to the source machine which is operating the application. In some embodiments, the client 210 presents a virtual processing unit for operating the application 212 of the client 210, but the application 212 is executed by for example the physical processing unit 234 on the source machine 220 in practice. The client 210 can intercept the request of the application 212 generated at the client, and transmit the same the request to the machine which is operating the application 212 in fact, for example to the source machine 220, such that the source machine 220 processes data for the request on the processing unit 234 thereon.

At block 504, in response to the addressing information of the target machine which the application from the source machine having been migrated to, the request for the application is redirected to the target machine, such that the request is processed on the target machine. For example, based on a predetermined migration policy, for example based on a need of a dynamic balance, the scheduler (not shown) of the system 200 transmits to the source machine 220 a migration request for migrating the application from the source machine 220 to the processing unit 254 of the target machine 240. In response to the migration request, the source machine 220 establishes a connection with the target machine 240 and performs application migration. Upon receiving an indication that the application 212 has been executed on the target machine 240, the source machine 220 transmits the message that the application 212 has been migrated, and the addressing information of the target machine 240, and in response to the addressing information, the client 210 establishes a connection with the target machine 240, generates a new request for the application 212 at the client 210 and forwards the same request to the target machine 240, so as to process the data upon the request. Through the foregoing means, the application requests generated by the client before and after migration are transmitted continuously to the respective machine for processing. This ensures complete and continuous execution of the requests and smooth migration of the application.

Figure 6:
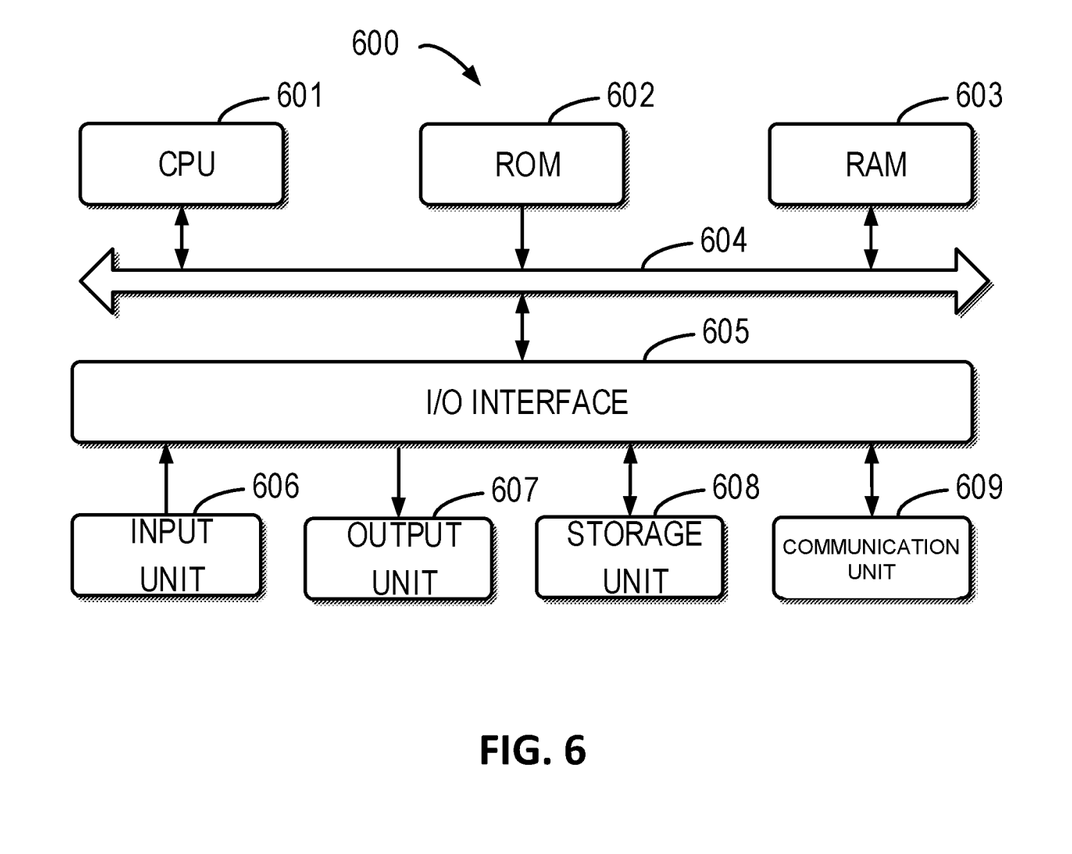
FIG. 6 schematically illustrates an electronic device 600 adapted to implement embodiments of the present application.

The methods 300, 400 and 500 as provided by the present disclosure can implement migration of the application being executed from the source machine to a further machine for continuing to operate the application, and reduce the influences of the application migration on the performance of the system while ensuring correctness of the integrity of the data before and after migration. By the optimization method of accelerating the data migration, the application to be migrated is executed quickly on the new machine, and by the coordinated cooperation among the client, the source machine and the target machine, the application requests before and after migration are transmitted continuously to the respective machine for processing, thereby improving smoothness of the application migration. By performing the methods 300, 400 and 500 as provided by the present disclosure, the machine learning and the cloud system can be configured to support a flexible policy, such as a dynamic load balance, QoS rescheduling, and the like, thereby covering the more complicated application. FIG. 6 schematically illustrates a block diagram of an electronic device 600 adapted to implement embodiments of the present disclosure. The device 600 can be used to implement one or more hosts of the client 210, the machine 220 and the machine 240 in FIG. 2. As shown, the device 600 includes a central processing unit (CPU) 601 that can perform various appropriate acts and processing based on computer program instructions stored in a read-only memory (ROM) 602 or computer program instructions loaded from a storage unit 608 to a random access memory (RAM) 603. The RAM 603 further stores various programs and data needed for operations of the device 600. The CPU 601, ROM 602 and RAM 603 are connected to each other via a bus 604. An input/output (I/O) interface 605 is also connected to the bus 604.

The following components in the device 600 are connected to the I/O interface 605: an input unit 606, such as a keyboard, a mouse and the like; an output unit 607, such as various kinds of displays and a loudspeaker, etc.; a storage unit 608, such as a magnetic disk, an optical disk, and etc.; a communication unit 609, such as a network card, a modem, and a wireless communication transceiver, etc. The communication unit 609 allows the device 600 to exchange information/data with other devices through a computer network such as the Internet and/or various kinds of telecommunications networks.

The processing unit 601 executes various methods and processing described above, for example the method 300 of application migration, the method 400 for a target machine of application migration, and a method 500 of a client of application migration. For example, in some embodiments, the methods 300, 400, 500 can be implemented as a computer software program that is tangibly embodied on a machine readable medium, e.g., the storage unit 608. In some embodiments, part or all of the computer programs can be loaded and/or mounted onto the device 600 via ROM 602 and/or communication unit 609. When the computer program is loaded to the RAM 603 and executed by the CPU 601, one or more steps of the methods 300, 400, 500 as described above can be executed. Alternatively, CPU 601 can also be configured to perform the methods 300, 400, 500 as described above in any other appropriate manner (for example, by means of firmware).

The present disclosure can be a method, an apparatus, a system and/or a computer program product. The computer program product can include a computer readable storage medium on which computer readable program instructions are carried out for performing each aspect of the present application.

The computer readable medium may be a tangible medium that may contain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the machine readable storage medium would include a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer programs products according to embodiments of the disclosure. It would be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processing unit of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Only optional embodiments of the present disclosure are provided in the above, which are not used to limit the present disclosure, and the present disclosure allows various modifications and changes for those skilled in the art. Within the spirits and principles of the present disclosure, any modification, equivalent substitution, improvement, and the like shall all be covered in the protection scope of the present disclosure.

We claim:

1. A method of application migration, comprising:
receiving a request to migrate an application operating at a source processing unit on a source machine to a target machine, the migration request specifying the application to be migrated, the target machine, and a target processing unit for operating the application at the target machine;
in response to receiving the migration request, establishing a connection between the source machine and the target machine;
identifying a plurality of threads related to operation of the application at the source processing unit;
synchronizing the plurality of threads at the source machine;
determining a resource descriptor and allocation and use conditions of two or more portions of a memory of the source machine related to operation of the application at the source processing unit;
transmitting, via the connection between the source machine and the target machine, the determined resource descriptor and allocation and use conditions of the two or more portions of the memory of the source machine to the target machine for migration preparation performed by the target machine;
determining application data to be migrated to the target machine based at least in part on the allocation and use conditions of the two or more portions of the memory of the source machine;
determining whether an amount of the application data to be migrated to the target machine exceeds a designated threshold;
in response to determining that the amount of the application data to be migrated to the target machine exceeds the designated threshold, transmitting one or more portions of the application data to be migrated sufficient to begin execution of the application on the target machine; and
at least one of: performing batch transmission of one or more remaining portions of the application data to be migrated to the target machine using a backstage process;
and performing on-demand asynchronous transmission of one or more remaining portions of the application data to be migrated to the target machine.

2. The method according to claim 1, wherein the source processing unit and the target processing unit are Graphic Processing Units (GPUs) or Field-Programmable Gate Arrays (FPGAs).

3. The method according to claim 1, further comprising, in response to migrating the application data to the target machine, transmitting requests for the application, which are received after receiving the migration request, to the target machine via a First-in First-out (FIFO) queue.

4. The method according to claim 1, further comprising, in response to receiving from the target machine an indication that the application has been executed on the target machine, transmitting addressing information of the target machine to a client, such that the client redirects a request for the application from the source machine to the target machine.

5. The method according to claim 1, wherein the allocation and use conditions comprise a starting address, a length, a type and use status of a memory allocated to the application.

6. The method according to claim 5, further comprising, in response to determining that the amount of the application data to be migrated to the target machine exceeds the designated threshold, transmitting a first portion of the application data to the target machine, the first portion of the application data comprising most recently used application data in the application data to be migrated.

7. The method according to claim 6, further comprising, in response to receiving an indication that the application has been executed on the target machine, transmitting a second portion of the application data to the target machine, the second portion of the application data comprising remaining application data in the application data to be migrated other than the first portion of the application data.

8. The method according to claim 6, further comprising, in response to receiving from the target machine a request for a third portion of the application data, transmitting the third portion of the application data to the target machine, the third portion of the application data comprising a portion of the application data in the application data to be migrated other than the first portion of the application data.

9. The method according to claim 1, further comprising performing the batch transmission of one or more of the remaining portions of the application data to be migrated to the target machine using the backstage process.

10. The method according to claim 1, further comprising performing the on-demand asynchronous transmission of one or more of the remaining portions of the application data to be migrated to the target machine.

11. The method according to claim 1, wherein the resource descriptor comprises a context and a handle of the application at the source processing unit.

12. The method according to claim 11, wherein the context indicates a general operating environment to be initialized on the target processing unit before operating code of the application.

13. The method according to claim 11, wherein the handle comprises a reference object of the client visible to an application programming interface operation related to the application.

14. The method according to claim 1, wherein the application data to be migrated comprises data stored in a subset of the two or more portions of the memory of the source machine having (i) an allocation condition of allocated and (ii) a use condition of used.

15. An apparatus comprising:
at least one processing device comprising a processor coupled to a memory;
the at least one processing device being configured:
to receive a request to migrate an application operating at a source processing unit on a source machine to a target machine, the migration request specifying the application to be migrated, the target machine, and a target processing unit for operating the application at the target machine;
in response to receiving the migration request, to establish a connection between the source machine and the target machine;
to identify a plurality of threads related to operation of the application at the source processing unit;
to synchronize the plurality of threads at the source machine;
to determine a resource descriptor and allocation and use conditions of two or more portions of a memory of the source machine related to operation of the application at the source processing unit;
to transmit, via the connection between the source machine and the target machine, the determined resource descriptor and allocation and use conditions of the two or more portions of the memory of the source machine to the target machine for migration preparation performed by the target machine;
to determine application data to be migrated to the target machine based at least in part on the allocation and use conditions of the two or more portions of the memory of the source machine;
to determine whether an amount of the application data to be migrated to the target machine exceeds a designated threshold;
in response to determining that the amount of the application data to be migrated to the target machine exceeds the designated threshold, to transmit one or more portions of the application data to be migrated sufficient to begin execution of the application on the target machine; and
to at least one of: perform batch transmission of one or more remaining portions of the application data to be migrated to the target machine using a backstage process; and perform on-demand asynchronous transmission of one or more remaining portions of the application data to be migrated to the target machine.

16. The apparatus according to claim 15, wherein the resource descriptor comprises a context and a handle of the application at the source processing unit, the context indicating a general operating environment to be initialized on the target processing unit before operating code of the application, the handle comprising a reference object of the client visible to an application programming interface operation related to the application.

17. The apparatus according to claim 15, wherein the application data to be migrated comprises data stored in a subset of the two or more portions of the memory of the source machine having (i) an allocation condition of allocated and (ii) a use condition of used.

18. A computer program product comprising a non-transitory processor-readable storage medium having stored therein program code of one or more software programs, wherein the program code when executed by at least one processing device causes the at least one processing device:
to receive a request to migrate an application operating at a source processing unit on a source machine to a target machine, the migration request specifying the application to be migrated, the target machine, and a target processing unit for operating the application at the target machine;
in response to receiving the migration request, to establish a connection between the source machine and the target machine;
to identify a plurality of threads related to operation of the application at the source processing unit;
to synchronize the plurality of threads at the source machine;
to determine a resource descriptor and allocation and use conditions of two or more portions of a memory of the source machine related to operation of the application at the source processing unit;
to transmit, via the connection between the source machine and the target machine, the determined resource descriptor and allocation and use conditions of the two or more portions of the memory of the source machine to the target machine for migration preparation performed by the target machine;

to determine application data to be migrated to the target machine based at least in part on the allocation and use conditions of the two or more portions of the memory of the source machine;

to determine whether an amount of the application data to be migrated to the target machine exceeds a designated threshold;

in response to determining that the amount of the application data to be migrated to the target machine exceeds the designated threshold, to transmit one or more portions of the application data to be migrated sufficient to begin execution of the application on the target machine; and to at least one of: perform batch transmission of one or more remaining portions of the application data to be migrated to the target machine using a backstage process; and perform on-demand asynchronous transmission of one or more remaining portions of the application data to be migrated to the target machine.

19. The computer program product according to claim 18, wherein the resource descriptor comprises a context and a handle of the application at the source processing unit, the context indicating a general operating environment to be initialized on the target processing unit before operating code of the application, the handle comprising a reference object of the client visible to an application programming interface operation related to the application.

20. The computer program product according to claim 18, wherein the application data to be migrated comprises data stored in a subset of the two or more portions of the memory of the source machine having (i) an allocation condition of allocated and (ii) a use condition of used.

* * * * *